United States Patent
Heung et al.

(12) 
(10) Patent No.: US 6,528,441 B1
(45) Date of Patent: *Mar. 4, 2003

(54) HYDROGEN STORAGE COMPOSITION AND METHOD

(75) Inventors: Leung K Heung, Aiken, SC (US); George G. Wicks, Aiken, SC (US)

(73) Assignee: Westinghouse Savannah River Company, L.L.C., Aiken, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/718,653

(22) Filed: Sep. 26, 1996

Related U.S. Application Data

(63) Continuation of application No. 08/505,781, filed on Jul. 21, 1995, now abandoned, which is a continuation of application No. 08/234,033, filed on Apr. 28, 1994, now abandoned, which is a division of application No. 07/968,641, filed on Oct. 29, 1992, now abandoned, which is a continuation-in-part of application No. 07/967,653, filed on Oct. 28, 1992, now abandoned.

(51) Int. Cl.$^7$ .............................. B01J 20/06; B01J 20/10
(52) U.S. Cl. ..................... 501/12; 516/111; 516/98; 420/900; 423/248; 502/405; 502/406; 502/407
(58) Field of Search .......................... 252/315.6, 315.7, 252/315.61, 181.1; 501/12; 502/406, 407, 405; 420/900; 516/111, 98; 428/248

(56) References Cited

U.S. PATENT DOCUMENTS

| | | | | |
|---|---|---|---|---|
| 4,098,595 A | * | 7/1978 | Lenz et al. | 501/12 |
| 4,680,045 A | * | 7/1987 | Osafune et al. | 501/12 |
| 5,306,555 A | * | 4/1994 | Ramamurth et al. | 501/12 |
| 5,411,928 A | * | 5/1995 | Heung et al. | 502/407 |

* cited by examiner

Primary Examiner—C. Melissa Koslow
(74) Attorney, Agent, or Firm—Dority & Manning, PA

(57) ABSTRACT

A hydrogen storage composition based on a metal hydride dispersed in an aerogel prepared by a sol-gel process. The starting material for the aerogel is an organometallic compound, including the alkoxysilanes, organometals of the form $M(OR)x$ and $MO_xR_y$, where R is an alkyl group of the form $C_nH_{2n+1}$, M is an oxide-forming metal, n, x, and y are integers, and y is two less than the valence of M. A sol is prepared by combining the starting material, alcohol, water, and an acid. The sol is conditioned to the proper viscosity and a hydride in the form of a fine powder is added. The mixture is polymerized and dried under supercritical conditions. The final product is a composition having a hydride uniformly dispersed throughout an inert, stable and highly porous matrix. It is capable of absorbing up to 30 moles of hydrogen per kilogram at room temperature and pressure, rapidly and reversibly. Hydrogen absorbed by the composition can be readily be recovered by heat or evacuation.

16 Claims, No Drawings

HYDROGEN STORAGE COMPOSITION AND METHOD

This application is a continuation of application Ser. No. 08/505,781 filed Jul. 21, 1995, now abandoned.

This is a continuation of application Ser. No. 08/234,033 filed Apr. 28, 1994 now abandoned, which is a divisional of application Ser. No. 07/968,641 filed Oct. 29, 1992, which is now abandoned and which is a continuation-in-part of application Ser. No. 07/967,653 filed Oct. 28, 1992, now abandoned.

The United States Government has rights in this invention pursuant to Contract No. DE-AC09-89SR18035 between the U.S. Department of Energy and Westinghouse Savannah River Company.

BACKGROUND OF THE INVENTION

1. Field of the Invention

The present invention relates the recovery and storage of hydrogen and, in particular, to hydride compositions and methods for storing hydrogen.

2. Discussion of Background

The hydrogen-absorbing materials known as hydrides are capable of absorbing large amounts of hydrogen which can then be desorbed under the appropriate temperature and pressure conditions. Hydrides are widely used in processes relying on the recovery, storage and supply of hydrogen, particularly in the hydrogen processing and energy conversion fields. Current uses include hydrogen storage, hydrogen pumping and compression, heat pumps, batteries, fuel cells and hydrogen isotopes purification and separation processes.

Known hydrides include pure metals (Mg, Ti, V, Nb, Pt, Pd, and so forth), alloys (the La-, Ti-, and Co- alloys, rare earth-Ni alloys), and various hydride-containing compositions. The capacity of a particular hydride to absorb or release hydrogen depends on the temperature and the external hydrogen gas pressure. The capacity of hydrides other than pure metals also depends on the surface area of the material. To maximize surface area and absorption/desorption efficiency, the material is often supplied in the form of fine-grained particles or pellets. The hydrogen-storage capacity of these materials is ultimately limited by the available surface area for hydrogen absorption.

Porous glass materials made by sol-gel processes have very large specific surface areas due to their high porosity. Typically, a solution (the sol solution) containing an organic liquid such as alcohol together with a metal oxide, alkoxide, alcoholate, sulfide or the like, is polymerized to obtain a gel. The alcohol replaces the water in the pores of the gel, and the gel is dried to remove the liquid phase and obtain a porous glass product. Drying is carried out in such a way as to minimize shrinkage and fracturing of the gel.

Drying at room temperature (about 20° C.) and atmospheric pressure results in xerogels, which have porosities up to approximately 80%. Drying at supercritical temperature and pressure conditions results in aerogels, which have porosities up to approximately 90% or higher. Drying under supercritical conditions prevents formation of a meniscus between the liquid and gaseous phases, so the liquid can be removed without subjecting the gel structure to compressive forces due to the surface tension of the liquid-gas interface.

Sol-gel processes can produce an inert, stable product with a very large specific surface area, up to 1000 m$^2$/g or higher. Advantages of sol-gel processes include low energy requirements, production of a high purity product, and uniform dispersion of additives into the product. See, for example, the processes for producing silica aerogels described by Blount (U.S. Pat. No. 4,954,327) and Zarzycki, et al. (U.S. Pat. No. 4,432,956).

A number of porous glass compositions have been developed. For example, an aerogel substrate may be loaded with tritium and combined with a radioluminescent composition, whereby the tritium is the energy source for the radioluminescent material (Ashley, et al.. U.S. Pat. No. 5,078,919). Porous glass is used in automobile catalytic converters as a support for metal catalysts (Elmer, et al., U.S. Pat. No. 3,802,647).

Porous glass compositions may be doped with metals or metal compounds, including metal alkoxides (Motoki, et al., U.S. Pat. No. 4,680,048), metals and alkoxides (Puyané, et al., U.S. Pat. No. 4,495,297), and metal oxides (Wada, et al., U.S. Pat. No. 4,978,641). Van Lierop, et al. (U.S. Pat. No. 4,806,328) add metal oxides to porous glass to adjust the refractive index.

Even with their high porosity—and correspondingly high specific surface area—such porous glass compositions absorb only small amounts of hydrogen by volume. These materials are therefore not suitable for use as hydrogen absorbers.

There is a need for a composition that can reversibly absorb large amounts of hydrogen. The composition should have a high porosity to allow permeation of hydrogen gas, thereby contacting the material with hydrogen to facilitate absorption. Preferably, it should maintain its hydrogen-absorbing capacity over a large number of absorption/desorption cycles.

SUMMARY OF THE INVENTION

According to its major aspects and broadly stated, the present invention is a hydride composite prepared by a sol-gel process. The starting material is an organometallic compound such as tetraethoxysilane. A sol is prepared by mixing the starting material, alcohol, water, and an acid. The sol is conditioned to the proper viscosity and a hydride in the form of a fine powder is added. The mixture is polymerized, then dried under supercritical conditions. The final product is a composition having a hydride uniformly dispersed throughout an inert, stable, highly porous matrix. The composition can be fabricated in the form of pellets or other shapes as needed for the particular application. The composition is capable of absorbing up to approximately 30 moles of hydrogen per kilogram at room temperature and pressure, rapidly and reversibly. Hydrogen absorbed by the composition can be readily be recovered by heat or evacuation. Uses for the composition include hydrogen storage and recovery, recovery of hydrogen from gas mixtures, and pumping and compressing hydrogen gas.

An important feature of the present invention is the matrix, made by a sol-gel process. A first mixture containing approximately two to five parts alcohol to one part of water is prepared. The acidity of the mixture is adjusted to the approximate range of 1.0 to 2.5 by adding an acid. A second mixture is prepared by mixing approximately one part alcohol to two parts of an organometallic compound such as an alkoxysilane, particularly tetraethoxysilane (($C_2H_5O$)$_4$Si). Alternatively, organometals of metals of the forms MO$_x$R$_y$ and M(O)$_x$, where R is an alkyl group of the form $C_nH_{2n+1}$, M is an oxide-forming metal, n, x, and y are integers, and y is two less than the valence of M, may be used. The first mixture is slowly added to the second, then the resulting solution is conditioned until it reaches the approximate viscosity of heavy oil. A hydride in the form of fine particles is added. Other additives such as foaming agents and stabilizers may also be added to the mixture. The mixture is polymerized to obtain a gel that contains the polymerized material and a liquid as two continuous phases. The gel is dried under supercritical conditions to remove the liquid phase. Drying under supercritical conditions can yield a composition with a porosity of 90% or higher. Drying may alternatively be carried out in air, or in other atmospheres including inert atmospheres. The optimum conditions and drying time are best determined by observation and a modest degree of experimentation for each particular composition.

An additional feature of the present invention is the hydride. The hydride is preferably a transition metal hydride such as Al, Cu, La, Ni. Pd, Pt, or combinations thereof, and most preferably Pt or a La—Ni—Al alloy. To maximize the surface area and catalyzing activity of the hydride, it is preferably supplied in the form of a powder having particles less than approximately 100 $\mu$m in size, in an amount up to approximately 50 wt. % of the dry gel. After polymerization and drying, the composition includes the uniformly dispersed hydride in a porous matrix with a high specific surface area.

Another feature of the present invention is the combination of the matrix and the hydride. The small size of the hydride particles maximizes the available surface area of the hydride for both catalysis and hydrogen absorption. The high specific surface area of the matrix provides a large area for hydrogen absorption thereon. However, the surface of an aerogel normally absorbs only a small amount of hydrogen by itself. The combination of the aerogel matrix with the hydride produces an unexpected synergistic effect: the composition is capable of storing surprisingly large amounts of hydrogen, more than the mathematically combined capacity of the aerogel and the hydride. separately. Although not wishing to be bound by theory, it is believed that the hydride may act as a catalyst to improve the hydrogen-storage capability of the aerogel matrix. See U.S. patent application Ser. No. 07/967,653 filed Oct. 28, 1992 and hereby incorporated by reference for information related to this application.

Other features and advantages of the present invention will be apparent to those skilled in the art from a careful reading of the Detailed Description of a Preferred Embodiment presented below.

DETAILED DESCRIPTION OF A PREFERRED EMBODIMENT

According to a preferred embodiment of the present invention, a hydride composition is prepared by a sol-gel process generally as follows. The starting material is an organometallic compound such as tetraethoxysilane. A sol is prepared by mixing the starting material, alcohol, water, and an acid. The sol is conditioned to the proper viscosity and a hydride in the form of a fine powder is added. The mixture is polymerized, then dried under supercritical conditions. The final product is a composition combining an inert, stable and highly porous matrix with a uniformly-dispersed hydride. The composition can rapidly and reversibly absorb surprisingly large amounts of hydrogen (up to approximately 30 moles/kg) at room temperature and pressure. Hydrogen absorbed by the composition can be readily be recovered by application of heat or vacuum.

The composition is prepared as follows:

1. To prepare the sol solution, add alcohol to water while stirring the water to form a first mixture. The ratio of alcohol to water in the mixture is preferably in the range of two to five parts of alcohol to one part of water. The ratio is chosen in view of the desired properties of the final product. For example, the higher the alcohol:water ratio of the mixture, the more uniform the final product; and the lower this ratio, the more granular the product. Preferably, the alcohol is ethanol, although other alcohols such as methanol may be used.

2. Adjust the acidity of the mixture by adding hydrochloric acid (HCl) until the pH is in the approximate range of 1.0 to 2.5. Stir the mixture for several minutes, preferably for approximately thirty minutes. If desired, other acids such as hydrosulfuric acid ($H_2SO_4$) or nitric acid,($HNO_3$) may be used. The pH and temperature of the mixture affect the properties of the final product, including its density, porosity, and specific surface area. The optimum conditions for producing a composition with the desired properties are therefore best determined by observation and a modest degree of experimentation.

3. Separately prepare a second mixture by mixing alcohol and an organometallic compound such as tetraethoxysilane (($C_2H_5O)_4Si$). Add alcohol to the tetraethoxysilane in the ratio of approximately one part ethanol to two parts tetraethoxysilane. Stir for several minutes, preferably for approximately thirty minutes. As for step (1) above, while ethanol is preferred, other alcohols such as methanol may be used.

Suitable organometallic compounds for use in the present invention include, but are not limited to, organometals of the forms $MO_xR_y$ and $M(OR)_x$, where R is an alkyl group of the form $C_nH_{2n+1}$, M is an oxide-forming metal, n, x, and y are integers, and y is two less than the valence of M. Other suitable organometals include the alkoxysilanes, particularly tetraethoxysilane. It will be understood that the optimum admixture of alcohol depends on the particular choice of organometal and the desired properties of the final product.

4. Add the first mixture to the second very slowly, preferably dropwise, stirring continuously, to form the sol solution.

5. Allow the sol to condition in a closed container for several hours at room temperature, preferably for about 24 hours.

6. Remove the cover of the container to evaporate some of the solvents, until the sol reaches the approximate viscosity of heavy oil.

7. When the sol reaches the proper viscosity, add a hydride in the form of fine particles, and stir to uniformly suspend the hydride particles in the solution. The hydride is preferably added in an amount up to approximately 50 wt. % of the dry gel. However, the catalytic effect of the hydride (discussed below) is evident even with very small admixtures, as small as 1 wt. % or less of the dry gel.

The hydrogen-absorption rate of hydrides is typically proportional to their surface area. Therefore, the smaller the particle size, the larger the surface area of the hydride and the better its overall hydrogen-absorption rate. The hydride is preferably a transition metal hydride such as Al, Cu, La, Ni, Pd, Pt, or combinations thereof, and most preferably Pt or a La—Ni—Al alloy. The hydride is supplied in the form of a fine powder having particles less than approximately 100 $\mu$m in size.

8. If desired, the density of the sol-hydride mixture can be adjusted by adding a foaming agent. Suitable foaming agents include, but are not limited to, alkali metal soaps, metal soaps, quaternary ammonium compounds, detergents, alkali metal phosphates, and amino compounds.

9. Polymerize the mixture by equilibrating in air at room temperature and pressure until a gel containing the polymerized material and a liquid as two continuous phases is formed.

Depending on the properties of the sol and the desired properties of the final product, polymerization may be carried out at different temperatures or pressures, in an inert atmosphere (such as helium or argon), or some convenient combination thereof. For example, lower temperatures typically slow down the polymerization reaction and may be desirable to prevent overly abrupt polymerization. The time required for substantially complete polymerization varies from a few minutes to several days, depending on the temperature, pressure, atmosphere, the pH of the sol, the materials used to produce the sol, and so forth.

The optimum conditions for polymerization are best determined by experimentation for each particular combination of materials in view of the desired properties of the composition. Process steps 1 to 8 as described above may also be carried out at any convenient temperature and pressure, or in atmospheres other than air, including but not limited to helium and argon.

10. Dry the gel to remove the liquid phase. Drying is carried out at the supercritical conditions of ethanol (or other alcohol produced in the polymerization process), that is, the temperature and pressure are maintained at the point where the solid, liquid, and vapor phases of ethanol coexist (243° C. and 63 atm.). Drying under supercritical conditions can yield a composition with a porosity of 90% or higher. Alternatively, drying may be carried out in air, or in other atmospheres including inert atmospheres when a greater density is acceptable.

It will be understood that the process steps described above may be varied without departing from the spirit of the present invention. By way of example only, the sol solution (steps 1 to 6) may be prepared by another suitable procedure known in the art, or conditioning (step 5) or evaporation (step 6) omitted if the mixture has a suitable viscosity.

The final product is a composition comprising a porous glass matrix containing uniformly distributed hydride particles. The matrix is highly porous, preferably with a porosity greater than 80% porous and most preferably greater than about 90%. Because of its high porosity, the matrix has a very large specific surface area, preferably greater than approximately 300 m$^2$/gram and most preferably 1000 m$^2$/gram or higher. The composition can be fabricated in the form of pellets or other shapes dimensioned to the anticipated use. The pellets are dimensionally stable, remaining intact after many hydrogen absorption-desorption cycles.

The higher the porosity and specific surface area of the composition, the more matrix surface and hydride surface is available for hydrogen absorption. As noted above, the surface of a porous glass composition normally absorbs only a small amount of hydrogen. Here, surprisingly, the combination of the aerogel matrix and the hydride is capable of storing very large amounts of hydrogen, more than the sum of the individual capacities of the aerogel and the hydride. While not wishing to be bound by theory, it is believed that the hydride may act as a catalyst to improve the hydrogen-storage capability of the composition. This catalytic effect should be evident even at very low hydride concentrations, as low as 1 wt. % of the dry gel.

By way of example, a composition according to the present invention is prepared by adding two parts ethanol to one part water, and adjusting the pH by adding hydrochloric acid. The pH-adjusted mixture is added to a mixture of approximately one part ethanol to two parts tetraethoxysilane. The sol is stirred for thirty minutes, then conditioned for about 24 hours and evaporated until it reaches the approximate viscosity of heavy oil. A hydride in an amount of 40 wt. % of the dry gel is added. The hydride is La—Ni—Al alloy, preferably in the form of particles less than 100 μm in size in order to promote uniform dispersion throughout the matrix and more effective contact with hydrogen, in an amount of 40 wt. % of the dry gel. The mixture is polymerized, then dried at room temperature and pressure.

This composition absorbs up to 10 moles/kg of hydrogen at room temperature and atmospheric pressure. The amount of hydride present in one kilogram of the composition is capable of absorbing only 5 moles of hydrogen. Since the aerogel alone can absorb only a negligible amount of hydrogen, the increased capacity is due to the synergy of the hydride and aerogel.

Depending on the choice of ingredients and the conditions under which the process steps are carried out, the composition may absorb up to 30 moles of hydrogen per kilogram at room temperature and pressure, rapidly and reversibly. Hydrogen absorbed by the composition can readily be recovered by heat or evacuation. Uses for the composition include hydrogen storage and recovery, recovery of hydrogen from gas mixtures, and pumping and compressing hydrogen gas.

What is claimed is:

1. A process for making a composition for use in storing hydrogen, said process comprising the steps of:

mixing approximately two to five parts ethanol to one part water to form a first mixture;

adjusting the pH of said first mixture into the range of approximately 1.0 to 2.5;

mixing approximately one part ethanol to two parts tetraethoxysilane to form a second mixture;

adding said first mixture to said second mixture to form a sol;

mixing particles of a metal hydride with said sol to form a third mixture, said hydride particles being capable of absorbing and desorbing hydrogen, said hydride particles being less than approximately 100 μm in size, said metal hydride particles being made of a La—Ni—Al alloy;

gelling said third mixture at room temperature to form a gel; and drying said gel to form an aerogel having said metal hydride particles uniformly dispersed therein.

2. The process as recited in claim 1, wherein said ethanol has supercritical conditions, and wherein said drying step is carried out under said supercritical conditions.

3. The process as recited in claim 1, wherein 100 grams of said aerogel is mixed with no more than approximately 50 grams of said metal hydride particles.

4. A process for making a composition for use in storing hydrogen, said process comprising the steps of:

mixing alcohol, water and an acid to form a first mixture;

mixing alcohol and an organometal to form a second mixture, said organometal being selected from the group consisting of the alkoxysilanes, organometals of the form $MO_xR_y$, and organometals of the form $M(O)_x$, where R is an organic ligand of the form $C_nH_{2n+1}$, and wherein M is an oxide-forming metal, n, x and y are integers and y is two less than the valence of M;

mixing said first and second mixtures to form a sol;

mixing particles of a metal hydride with said sol to form a third mixture, said metal hydride particles being capable of absorbing and desorbing hydrogen, said metal hydride particle being made of a La—Ni—Al alloy;

gelling said third mixture to form a gel; and drying said gel to form an aerogel having said metal particles dispersed therein.

5. The process of claim 4, wherein said organometal is tetraethoxysilane.

6. The process of claim 4, wherein said alcohol is selected from the group consisting of ethanol and methanol.

7. The process of claim 4, wherein said acid is selected from the group consisting of hydrochloric acid, hydrosulfuric acid, and nitric acid.

8. The process of claim 4, wherein said drying step is carried out under supercritical conditions.

9. The process of claim 4, wherein said gelling step is carried out at room temperature.

10. The process of claim 4, further comprising the step of conditioning said sol at room temperature before mixing said metal hydride particles therewith.

11. A sol-gel method for preparing a metal hydride composite, said method comprising the steps of:

mixing a first alcohol and water to form a first mixture;

adjusting the pH of said first mixture;

mixing a second alcohol and an organometal to form a second mixture;

mixing said and second mixtures to form a sol;

mixing particles of a metal hydride with said sol to form a third mixture, said particles being capable of absorbing and desorbing hydrogen, said metal hydride particles being made of a La—Ni—Al alloy;

gelling said third mixture to form a gel; and drying said gel to form an aerogel having said particles uniformly dispersed therein.

12. The method of claim 11, wherein said the gelling step occurs at room temperature.

13. The method of claim 11, wherein the first alcohol is ethanol.

14. The method of claim 13, wherein said ethanol has supercritical conditions, and wherein said drying step is carried out under said supercritical conditions.

15. The method of claim 11, wherein the organometal is tetraethoxysilane.

16. The method of claim 11, wherein said metal hydride particles are less than 100 $\mu$m in size.

* * * * *